Nov. 19, 1946.    F. H. REICHEL ET AL    2,411,239
APPARATUS FOR DIALYZING
Filed July 8, 1943    2 Sheets-Sheet 1
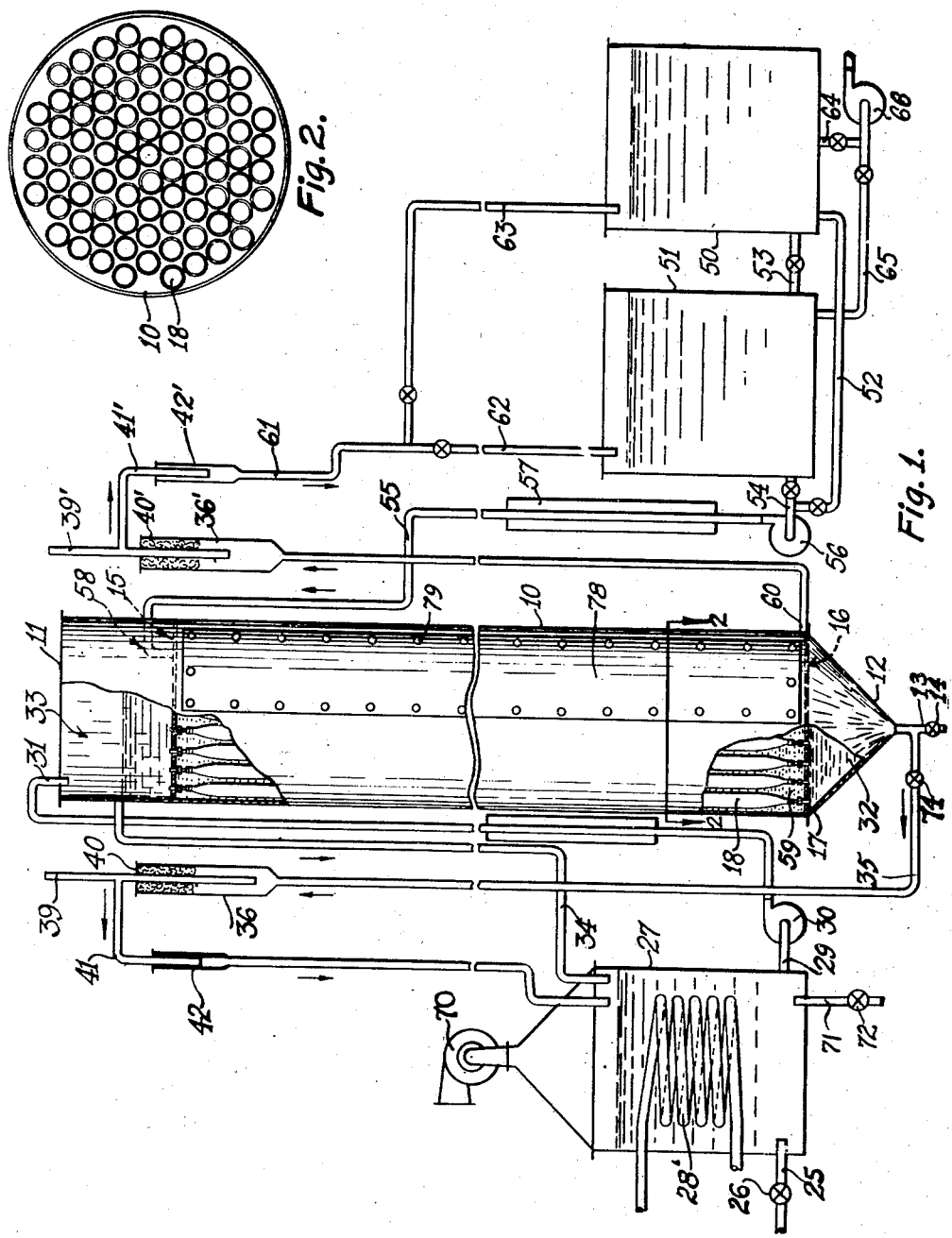
INVENTOR
FRANK H. REICHEL and
ARTHUR O. RUSSELL
BY Worth Wade
ATTORNEY Nov. 19, 1946.    F. H. REICHEL ET AL    2,411,239
APPARATUS FOR DIALYZING
Filed July 8, 1943    2 Sheets-Sheet 2
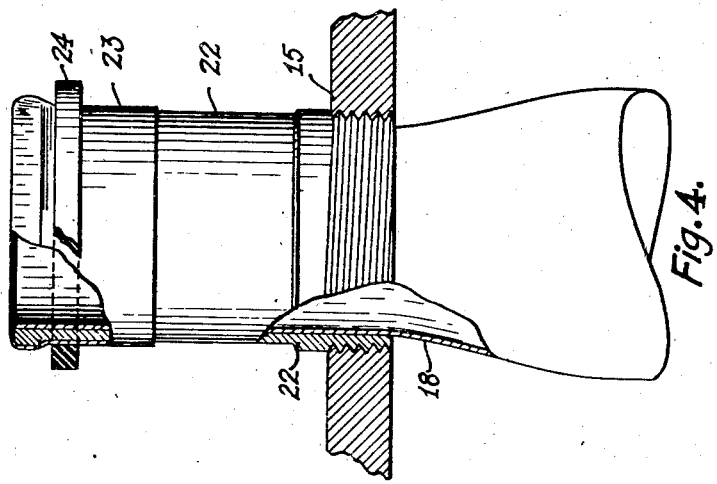
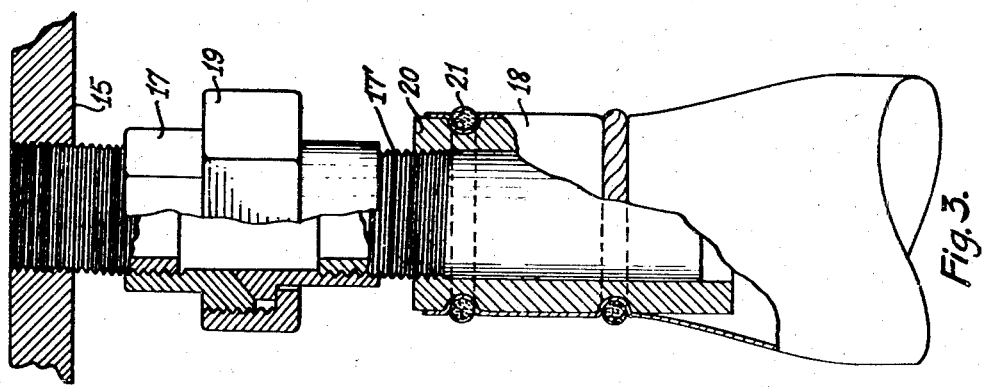
INVENTORS
FRANK H. REICHEL and
ARTHUR O. RUSSELL
BY
Worth Wade
ATTORNEY Patented Nov. 19, 1946

2,411,239

UNITED STATES PATENT OFFICE 2,411,239

APPARATUS FOR DIALYZING

Frank H. Reichel and Arthur O. Russell, Fredericksburg, Va., assignors to Sylvania Industrial Corporation, Fredericksburg, Va., a corporation of Virginia Application July 8, 1943, Serial No. 493,919

6 Claims. (Cl. 210—8.5)

The invention relates in general to dialysis, and, in particular, to an apparatus for the separation of a soluble substance from its solution by dialysis, and to correlated improvements designed to enhance the structure and function and to extend the uses of such apparatus.

It has been proposed to dialyze soluble materials from their aqueous solutions through hydrophilic membranes, such, for example, as sheets of regenerated cellulose, parchment paper, and the like. However, dialyzers employing membranes in the form of flat sheets have certain inherent disadvantages. For example, the edges of the sheets must be maintained under pressure or firmly sealed to avoid loss of liquid during dialysis. To clean the apparatus or to replace a broken sheet it is generally necessary to completely dismantle the dialyzer. Further, to decrease breakage, the membranes must be supported over their surfaces. Finally, such prior apparatus did not provide any means for retarding the dilution of the solution being dialyzed. Thus, sheet dialyzers of prior design have generally been complicated in construction, difficult to repair or to clean and capable of handling only small volumes of liquid.

Accordingly, it is a general object of the present invention to provide a dialyzer which will be capable of handling large volumes of liquid and which will operate rapidly.

It is a further general object to provide a dialyzing apparatus which is easy to construct and to clean and in which broken membranes may be replaced without completely dismantling the dialyzer.

A specific object is to provide an apparatus for means of retarding the dilution of the solution being dialyzed.

Other objects of the invention will in part be obvious, and will in part appear hereinafter.

According to the present invention, there is provided an apparatus for the dialysis of solutions comprising in combination a chamber, a dialyzing membrane in the form of a tube disposed therein, means to pass the solution to be dialyzed into contact with one surface of the tube, means to pass another liquid into contact with the other surface of the tube, means to heat the solution being dialyzed and/or the other liquid, and preferably means to maintain a pressure differential between the inside and the outside of the tube to distend the tube.

In the following specifications and in the appended claims, the term "dialyzate" will be used to designate the solution being dialyzed in accordance with recent usage in the art; the term "diffusate" will designate the solution of the material which diffuses through the membrane during dialysis, and the term "dialysis" will be used to designate the diffusion of soluble substances through a semi-permeable membrane from one liquid into another.

The invention accordingly comprises the features of construction, combinations of elements, and arrangement of parts which will be exemplified in the construction hereinafter set forth and the scope of the invention will be indicated in the claims.

For a more complete understanding of the nature and objects of the invention, reference should be had to the accompanying drawings in which Figure 1 represents a side elevation of one embodiment of the apparatus of the invention, and Figure 2 represents a cross-sectional view of the dialysis chamber of the apparatus of Figure 1 taken along the line 2—2 thereof. Figures 3 and 4 show two embodiments of means for anchoring the dialyzing tubes to the headers of the apparatus shown in Figure 1.

In that embodiment of the apparatus shown in Figs. 1 and 2, the dialyzing chamber proper comprises a vertical outer chamber 10, which is shown as a cylindrical chamber, but which may be of any cross-sectional shape. The chamber is closed at the top by a plate 11, and is closed at the bottom by a conical base 12, which is provided with a drain 13 having a valve 14. Situated adjacent the ends inside the chamber 10, there are positioned headers 15 and 16, each provided with a plurality of holes into which are threaded short sections of pipe 17, which serve to anchor the dialysis tubes 18 to the headers.

The chamber 10 is provided with a removable side portion 78 attached to the tank by the bolts 79 so as to make the dialysis tubes 18 accessible from the outside. When a tube bursts, it is thus possible to reach it and insert a new tube. To change a tube, particularly where it is in the center or opposite side of the chamber, it is desirable to drain the apparatus. The empty tubes obstructing the way may then be collapsed and pushed to one side to a sufficient extent to insert the new tube in its proper location. In order to insert a new tube, it is therefore not necessary, in general, to remove the tube located between the opening into the chamber and the tube to be replaced.

The anchoring or sealing of the dialysis tubes to the headers may be effected by any suitable means, but there is shown in Figs. 3 and 4 two means found suitable for this purpose. Referring to Fig. 3, the numeral 15 represents the upper header into which is screwed a short section of pipe 17 having a threaded union joint 19, the lower end of the pipe 17' being sealed by means of a tubular sleeve 20 formed of a resilient material, such, for example as rubber, cork, sponge, or the like, which forms a soft cushion to support the dialysis tube 18, which is slipped over the sleeve and fixed thereto by means of the cords 21. If desired, the outer surface of the sleeve 18 may be grooved to provide seats for the cord 21. The lower end of the dialysis tube 18 may be united to the lower header by similar means as shown in Fig. 3. The joint shown in Fig. 3 is particularly advantageous when the chamber is being fitted with the tubes initially or when a dialysis tube is being replaced after breakage because, in this case, the disconnection of the lower section of the pipe 17 from the upper section, and the mounting of the tube 18 on the sleeve 20 can take place outside of the chamber 10, after which the ends are joined to the headers by means of the threaded joint 19.

An alternative means of anchoring the dialysis tubes to the headers is illustrated in Fig. 4, in which embodiment the header 15 is provided with a threaded section of pipe 22. The casing is pulled through the section of the pipe and the end turned down over the upper end of the pipe 22 to form the cuff 23 which may be anchored to the pipe by means of the band 24, which may be formed of rubber as shown, or of metal or the like. The tube 18 may be mounted on the lower header 16 by means similar to that shown in Fig. 4. The coupling shown in Fig. 4 has the advantage of maintaining the maximum diameter of the tube 18 at the joint, and thus does not interfere with the flow of the liquid through the tube 18.

The dialysis tubes 18 may be disposed and arranged within the chamber 10 in any desired manner, in rows, for example, as shown in Fig. 2 or in concentric circles. The space between the tubes can be varied as desired, but in general a distance of the order of ½ to 1 inch is sufficient. It is to be understood that a space exists around all of the tubes illustrated in Fig. 2, and that none of these tubes are in direct contact with each other along their longitudinal surfaces.

It may be understood that the apparatus shown in Fig. 1 may be constructed and arranged that the dialyzate may be caused to pass inside the tubes or outside the tubes, but for the purpose of illustration only, the apparatus of Fig. 1 is shown constructed so that the dialyzate will pass through the interior of the tube 18. The liquid to be dialyzed, that is, the dialyzate, may be taken from a suitable reservoir and fed through the pipe 25 having a valve 26 into an evaporator 27. The liquid in the evaporator may be heated from 30° to 100° C., preferably above 70° C., by conventional means and/or suction may be applied through the pump 70 to draw off water, alcohol and other volatile substances from the dialyzate. Heating and suction also facilitate elimination of bubbles from the dialyzate, the presence of which tends to favor the growth of organisms which attack the dialyzing membranes. The evaporator can be drained for cleaning by opening the outlet pipe 71 by means of valve 72. From the evaporator, the dialyzate passes through the pipe 29 by means of the pump 30, and is then heated by means of the heater 28 and introduced into the chamber 10 through the inlet 31. The dialyzate fills the lower space 32 of the chamber, the tubes 18, and the upper space 33 until the level is such that the dialyzate overflows through the drain 34 which returns the excess to the evaporator 27.

During operation, the dialyzate is preferably continuously circulated. Therefore, there is provided an outlet pipe 35 equipped with a valve 74 which is positioned at the base of the conical bottom 12. The pipe 35 is disposed vertically and has attached to its upper end an enlarged section 36 into which is disposed an extension tube 39 sliding through a hole provided in the packing 40. Between the ends of the tube 39, a branch 41 carries the solution into a pipe 42 which is attached to the upper end and surrounds the lower end of the pipe 41 which slides therein. Pipe 42 discharges the dialyzate into the evaporator 27. By raising or lowering the pipe 39, it is possible to assure that the level of the dialyzate in the chamber 33 will be at all times above the header 15, and if necessary, up to the level of the overflow pipe 34. By this means, one can insure that the dialyzing tubes will be completely filled with the dialyzate even though the dialyzate is being circulated downward through these tubes.

The apparatus also includes means for bringing a liquid into contact with the outside of the dialyzing tubes 18. These means comprise storage tanks 50 and 51 from which liquid may be removed by means of pipes 52, 53, and 54, each of which is provided with a suitable valve, the liquid being forced upward through the pipe 55 by means of the pump 56 and heated if desired by means of the cylindrical heater 57. The pipe 55 provides means for entering the chamber 10 at a point above the upper header and then communicates with the space between the headers by passing through the plate 15 as shown by the broken lines 58. The diffusate flows downward and around the tubes 18 until it fills completely the space 59 between the headers 15 and 16. The excess liquid is removed from the lower end of the space 59 through pipe 60, which has an enlarged upper end 36', an extension 39' passing through the packing 40', the extension 39' having a branch 41' which discharges the liquid into a funnel 42' which is fixed into the upper end of the drain 61. From pipe 61 the diffusate may be passed through the pipe 62 to the reservoir 51 or through the pipe 63 to the reservoir 50. The diffusate may be discharged from the reservoir 50 through the pipe 64 or from the reservoir 51 through the pipe 65 and forced by means of the pump 66 to storage or point of use.

While the apparatus shown in Fig. 1 is constructed so that both the dialyzate and the diffusate flow concurrently and downward in the chamber 10, it is to be understood that the apparatus can be modified without transcending the scope of the present invention so as to provide that the dialyzate and the diffusate flow upward or flow countercurrent to each other.

Further, the apparatus may be readily modified by anyone skilled in the art, without transcending the scope of the present invention so that the chamber 10 and the tubes 18 are disposed in a horizontal plane. Inasmuch as the tubes 18 during operation are not only completely filled with liquid but also are completely surrounded by liquid, the tubes will require little or no horizontal support. If the tubes 18 are filled with dialyzate, which has a higher specific gravity than the diffusate, the tubes will tend to float so that they can be kept in position merely by suitable guide pins.

During the process of dialysis, water from the diffusate continuously diffuses into the more concentrated dialyzate, thus diluting the dialyzate and slowing down the process of dialysis. In order to avoid this decrease in the rate of diffusion resulting from dialysis, the present apparatus provides an evaporator 27 in which the dialyzate may be heated by means of the steam coil 28'. The top of the tank 27 is left open to permit evaporation of water from the dialyzate. By this means, the dialyzate may be continually concentrated while it is being circulated and subjected to dialysis. Moreover, the heating of the dialyzate serves the purpose of evaporating water or other volatile liquids from the dialyzate thus maintaining the concentration and viscosity of this liquid. The temperature of the dialyzate may be kept above the temperature at which the fermentation or bacterial decomposition occurs, thus avoiding changes in composition or loss of desired material through fermentation.

The present apparatus is adapted for dialyzing both organic and inorganic substances from organic or aqueous solutions. Organic substances may be separated from solutions by use of a semipermeable hydrophobic tubing. For the dialysis of aqueous solutions, a hydrophilic tubing is employed. Accordingly, the present apparatus may be used for separating inorganic or organic crystalloids from their solutions, or for separating crystalloids from colloids, or for separating inorganic liquids from organic liquids, or for separating organic liquids from aqueous or non-aqueous solutions. In particular, the apparatus is applicable for the separation of glycerine, butylene glycol, and citric acid, sugar and inorganic salts from their aqueous solutions.

The heating of the dialyzate from 70°-100° C. serves a four-fold purpose: (a) to continuously concentrate the dialyzate since water is evaporated in the evaporator; (b) to increase the rate of dialysis; (c) to eliminate dissolved air and air bubbles; (d) to sterilize the dialyzate and prevent further fermentation.

The apparatus has many advantages, namely, the dialyzing membranes being in the form of a tube are more self-supporting than flat sheets and they can be readily anchored at each end without danger of leaks. When a tube breaks, the liquid may be quickly drained from the apparatus and a tube replaced without dismantling the entire apparatus. Since the tubes are not constricted at the entrance or exit where they are joined to the headers, the flow of liquid therethrough is not retarded and there is no tendency for sediment to collect inside the tube; further, a rapid flow can be maintained through the tubes. Thus, there is provided a means for continuously concentrating the dialyzate while preventing the rate of dialysis from dropping too rapidly, thereby resulting in an increase in the yield.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. An apparatus for the dialysis of liquid solutions comprising, in combination, a chamber, means of dialysis comprising a dialyzing membrane in the form of a tube disposed therein, means for continuously circulating the solution to be dialyzed in contact with one surface of the tube, means for passing another liquid into contact with the other surface of the tube, means for concentrating the dialyzate after passage through the dialyzing tube, and means for recirculating the concentrated dialyzate through the tube.

2. An apparatus for the dialysis of liquid solutions comprising, in combination, a chamber, means of dialysis comprising a dialyzing membrane in the form of a tube disposed therein, means for continuously circulating the solution to be dialyzed in contact with one surface of the tube, means for passing another liquid into contact with the other surface of the tube, means for concentrating the dialyzate after passage through the dialyzing tube, means for recirculating the concentrated dialyzate through the tube, and means for maintaining a hydrostatic pressure differential between the inside and outside of said tube to distend the tube.

3. An apparatus for the dialysis of liquid solutions comprising, in combination, a chamber, headers disposed transversely adjacent each end of said chamber so as to divide said chamber into a middle and two end compartments, a plurality of tubular dialyzing membranes disposed between said headers and communicating with the end compartments, means for continuously circulating a solution through the end compartments and through said dialyzing tubes means for withdrawing said solution from said tubes, means for passing another liquid through said middle compartment into contact with the exterior of said dialyzing tubes and means for withdrawing said liquid from said compartment.

4. An apparatus according to claim 3 in which the tubes are affixed to the headers by means of a threaded union joint so that said tubes are separately removable.

5. An apparatus according to claim 3 in which there is provided means for concentrating one of said liquids positioned outside of said chamber.

6. An apparatus according to claim 3 in which there is provided means for heating at least one of said liquids.

FRANK H. REICHEL.
ARTHUR O. RUSSELL.